(12) United States Patent
Sugden et al.

(10) Patent No.: US 6,996,962 B1
(45) Date of Patent: Feb. 14, 2006

(54) ADJUSTABLE BAFFLE FOR MOWING DECK

(75) Inventors: David J. Sugden, Horicon, WI (US); Kevin Boeck, Van Dyne, WI (US)

(73) Assignee: Scag Power Equipment, Inc., Mayville, WI (US)

( * ) Notice: Subject to any disclaimer, the term of this patent is extended or adjusted under 35 U.S.C. 154(b) by 0 days.

(21) Appl. No.: 11/037,974

(22) Filed: Jan. 18, 2005

Related U.S. Application Data

(63) Continuation of application No. 10/342,123, filed on Jan. 14, 2003.

(60) Provisional application No. 60/348,433, filed on Jan. 14, 2002, provisional application No. 60/401,536, filed on Aug. 7, 2002.

(51) Int. Cl.
*A01D 34/03* (2006.01)
*A01D 34/43* (2006.01)
*A01D 34/64* (2006.01)

(52) U.S. Cl. ...................................................... 56/17.4
(58) Field of Classification Search ............... 56/320.1, 56/16.7, 17.4, 16.9, 255, 295
See application file for complete search history.

(56) References Cited

U.S. PATENT DOCUMENTS

| | | | |
|---|---|---|---|
| 4,226,074 A | 10/1980 | Mullet et al. | |
| 4,435,949 A | 3/1984 | Heismann | |
| 4,543,773 A * | 10/1985 | Reilly | 56/13.6 |
| 4,916,887 A | 4/1990 | Mullet et al. | |
| 4,930,298 A | 6/1990 | Zenner | |
| 4,951,449 A | 8/1990 | Thorud | |
| 5,090,183 A | 2/1992 | Thorud et al. | |
| 5,133,176 A | 7/1992 | Baumann et al. | |
| 5,191,756 A | 3/1993 | Kuhn | |
| 5,205,112 A | 4/1993 | Tillotson et al. | |
| 5,457,947 A * | 10/1995 | Samejima et al. | 56/16.7 |
| 5,483,790 A | 1/1996 | Kuhn et al. | |
| 5,609,011 A | 3/1997 | Kuhn et al. | |
| 5,628,171 A | 5/1997 | Stewart et al. | |
| 5,765,346 A | 6/1998 | Benter et al. | |
| 5,884,466 A * | 3/1999 | Willmering et al. | 56/320.1 |
| 5,987,863 A * | 11/1999 | Busboom et al. | 56/320.1 |
| 6,189,307 B1 * | 2/2001 | Buss et al. | 56/320.1 |
| 6,192,666 B1 * | 2/2001 | Sugden et al. | 56/320.2 |

* cited by examiner

*Primary Examiner*—Árpád Fábián Kovács
(74) *Attorney, Agent, or Firm*—Boyle Fredrickson Newholm Stein & Gratz S.C.

(57) ABSTRACT

An adjustable baffle assembly that can be moveably coupled to a front flow control baffle of a lawnmower cutting deck. The adjustable baffle assembly includes a first wall that is securable to the front flow control baffle in at least a first position and a second position. In some embodiments, the adjustable baffle also includes at least one flange that extends generally rearwardly from a bottom edge of the first wall into a generally triangularly shaped space defined between adjacent cutting circles.

8 Claims, 13 Drawing Sheets

ADJUSTABLE BAFFLE FOR MOWING DECK

CROSS-REFERENCE TO RELATED APPLICATIONS

This application is a continuation of U.S. patent application Ser. No. 10/342,123, filed Jan. 14, 2003, the entirety of which is incorporated by reference herein, and which claimed the benefit of priority under 35 U.S.C. § 119(e) of U.S. Provisional Application No. 60/348,433, filed Jan. 14, 2002, and of U.S. Provisional Application No. 60/401,536, filed Aug. 7, 2002, the entire contents of each of which are hereby expressly incorporated by reference into the present application.

FIELD OF THE INVENTION

The invention relates to lawnmowers, and more particularly to cutting decks for lawn mowers.

BACKGROUND OF THE INVENTION

It is known to provide baffles on the underside of lawnmower cutting decks to create a desired airflow underneath the deck, to prevent air from blowing out the front of the deck, and to facilitate the mulching of grass. Typically, the baffles are permanently welded or semi-permanently bolted to the underside of the deck.

The height of the baffle (the distance the baffle extends from the underside of the deck toward the ground) is one of the critical variables found to have a significant impact on the quality of cut. Depending on the type of grass being cut and the manner in which the deck is being used (e.g., side discharge, rear discharge, mulching, or bagging), the quality of cut will vary significantly with the height of the baffles.

SUMMARY OF THE INVENTION

The present invention provides an adjustable baffle for a mower deck that includes a contoured front baffle that partially defines at least one cutting chamber. The adjustable baffle includes a wall having at least one substantially linear portion and at least one arcuate portion. The wall has a contour that corresponds to at least a portion of the contoured front baffle. The adjustable baffle also includes a plurality of mounting apertures defined by the wall and a plurality of fasteners that are selectively positionable with respect to the plurality of mounting apertures to selectively couple the wall of the adjustable baffle to the front baffle in at least a first position and a second position.

The present invention also provides an adjustable baffle including a first wall having a bottom edge and being selectively coupleable to the front baffle in at least a first position and a second position. The adjustable baffle also includes a flange that extends from the bottom edge toward the at least two cutting chambers.

The present invention further provides a mower deck that is securable to a lawnmower. The mower deck includes a top wall, first and second spindles that are supported by the top wall, and first and second cutting blades that are rotatably supported by respective spindles. Each cutting blade defines a cutting circle as the cutting blade rotates. A rear baffle extends from a rearward portion of the top wall proximate the cutting circles, and a front baffle extends from a forward portion of the top wall. The front and rear baffles cooperate to at least partially define cutting chambers. An adjustable baffle is coupled to the front baffle and is moveable with respect to the top wall to at least a first position and a second position. The adjustable baffle includes a flange that is spaced from the top wall and that extends into the cutting chambers toward the cutting circles.

Other features and advantages of the invention will become apparent to those skilled in the art upon review of the following detailed description, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIGS. 1–4 illustrate an adjustable baffle assembly 10 and a cutting deck 14 to which the adjustable baffle assembly 10 can be mounted. The cutting deck 14 can be any size and the adjustable baffle assembly 10 can be formed in a variety of shapes and sizes to fit a variety of deck sizes. The deck 14 can be mounted on or coupled to substantially any type of mower including, without limitation, ride-on, walk-behind, and pull-behind mowers, for example. The deck 14 is preferably a steel weldment including a top wall 18 defining a bottom surface 22, a rear wall 26, sidewalls 30, and a front wall 34. Rollers 36 can be coupled to the front wall 34 to provide rolling support for the deck 14.

The deck 14 further includes a rear baffle weldment 38 and a front flow control baffle weldment 42 spaced from the front wall 34 and extending between the opposing sidewalls 30. In the illustrated embodiment, the front flow control baffle weldment 42 includes a combination of substantially linear and substantially arcuate portions, while the rear baffle weldment 38 includes primarily arcuate portions. The front flow control baffle weldment 42 and the rear baffle weldment 38 cooperate to partially define three individual cutting chambers 46 that are shown being in communication with one another, but that can also be isolated from one another via mulching baffles (not shown), if desired. Other shapes and configurations of the front flow control baffle weldment 42 and the rear baffle weldment 38 can also be provided to define cutting chambers 46 having different shapes and configurations, depending at least in part on the desired cutting characteristics.

In the illustrated embodiment, the majority of the front flow control baffle weldment 42 extends from the bottom surface 22 of the top wall 18 a distance of approximately three inches to a lower edge 48. Of course, the height of the front flow control baffle weldment 42 can vary from deck to deck and can also vary across the width of a single deck. The front flow control baffle weldment 42 includes mounting apertures 50 configured to receive mounting hardware, as will be described in detail below.

With reference to FIGS. 3–6, the adjustable baffle assembly 10 includes a wall defined by a first baffle portion 54 and a second baffle portion 58. In the illustrated embodiment, the first and second baffle portions 54 and 58 are welded together, however other coupling techniques can also be used. Alternatively, the baffle assembly 10 can be constructed as a single piece.

The baffle assembly 10 is formed to have a profile that substantially corresponds to the contour of the front flow control baffle weldment 42, such that the baffle assembly 10 can be coupled to the front flow control baffle weldment 42. The specific contour of the front flow control baffle weldment 42 and the baffle assembly 10 can also vary, as will be further described below. In the illustrated embodiment, the baffle assembly 10 has a height of approximately three inches. Of course, the height of the baffle assembly 10 can vary as desired, and is not necessarily the same across the entire length of the baffle assembly 10. The baffle assembly 10 includes mounting apertures 62 selectively positioned to permit coupling the baffle assembly 10 to the front flow control baffle weldment 42 to achieve a plurality of baffle height settings. The baffle assembly 10 also includes mulching baffle mounting apertures in the form of slots 66, which cooperate with some of the mounting apertures 50 on the front flow control baffle weldment 42 to permit coupling mulching baffles (not shown) to the front flow control baffle weldment 42 and the baffle assembly 10.

Figure 3:
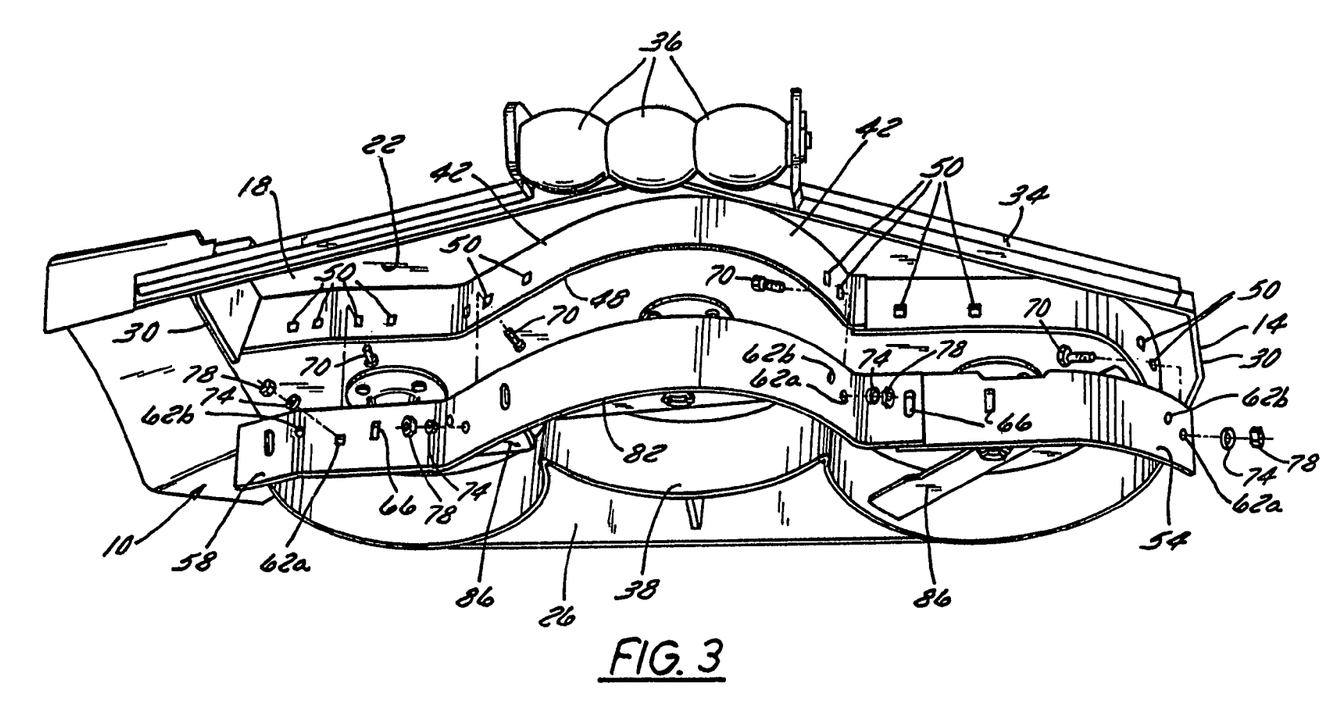
FIG. 3 is an exploded view of the deck and adjustable baffle assembly illustrating how to mount the adjustable baffle assembly at a first baffle height setting.

As best shown in FIG. 3, the illustrated baffle assembly 10 can be mounted to the front flow control baffle weldment 42 to achieve a first baffle assembly height of approximately three and one-half inches from the bottom surface 22 of the deck 14. To achieve this first baffle assembly height setting, a bottom set of the mounting holes 62a is aligned with corresponding mounting holes 50 of the front flow control baffle weldment 42. In the illustrated construction, the bottom set of mounting holes 62a is spaced such that when the mounting holes 62a are aligned with the corresponding mounting holes 50, and fasteners in the form of carriage bolts 70 are passed through the holes 62a and 50 and secured with washers 74 and nuts 78, a bottom edge 82 of the baffle assembly 10 extends approximately one-half inch beyond the lower edge 48 of the front flow control baffle weldment 42. The slots 66 align with other mounting apertures 50 to permit the mounting of mulching baffles (not shown) to the baffle assembly 10 and the front flow control baffle weldment 42. Of course, other types of fasteners and other fastening methods can be substituted for the bolts 70, washers 74, and nuts 78, if desired.

While the baffle assembly 10 is illustrated as being coupled to the front side of the front flow control baffle weldment 42, the baffle assembly 10 could alternatively be coupled to the rear side of the front flow control baffle weldment 42. Of course, such an adjustment would require slight modifications to the baffle assembly 10, and perhaps also to the front flow control baffle weldment 42. Specifically, the spacing between the front flow control baffle weldment 42 and the front wall 34 may need to be changed to maintain the proper size of the cutting chambers 46.

Figure 4:
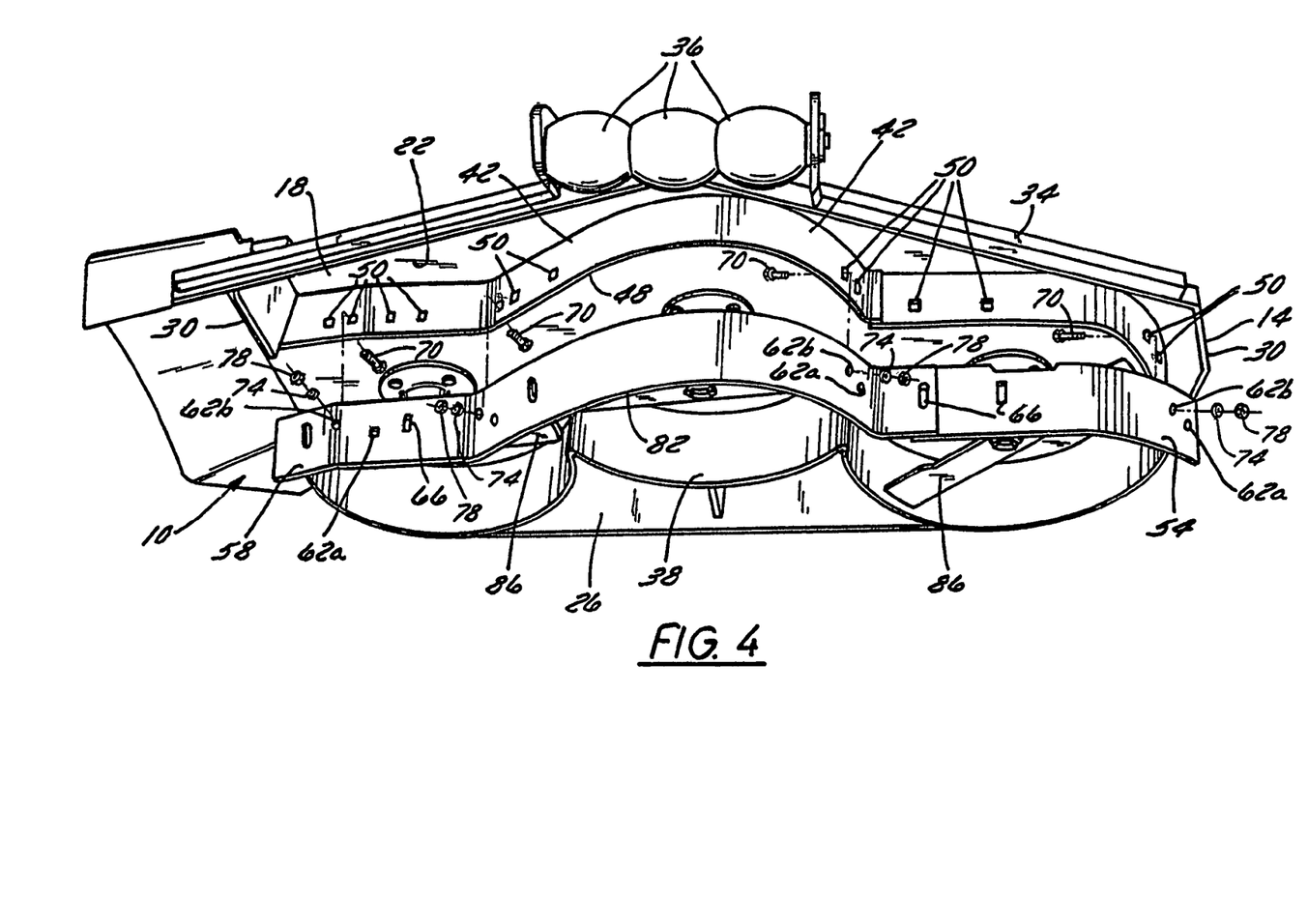
FIG. 4 is an exploded view of the deck and adjustable baffle assembly illustrating how to mount the adjustable baffle assembly at a second baffle height setting.
Figure 5:
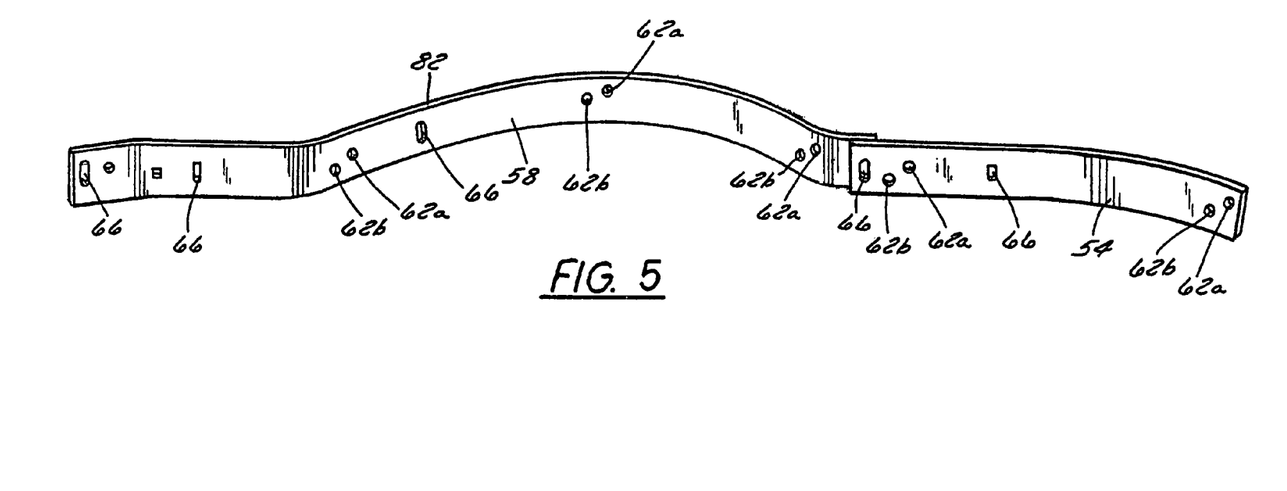
FIG. 5 is a perspective view showing the adjustable baffle assembly removed from the cutting deck.
Figure 6:
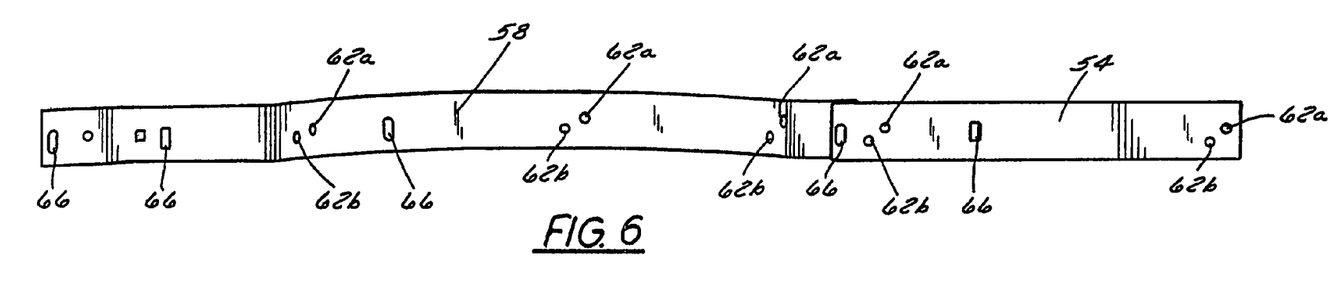
FIG. 6 is a rear view showing the adjustable baffle assembly removed from the cutting deck.
Figure 7:
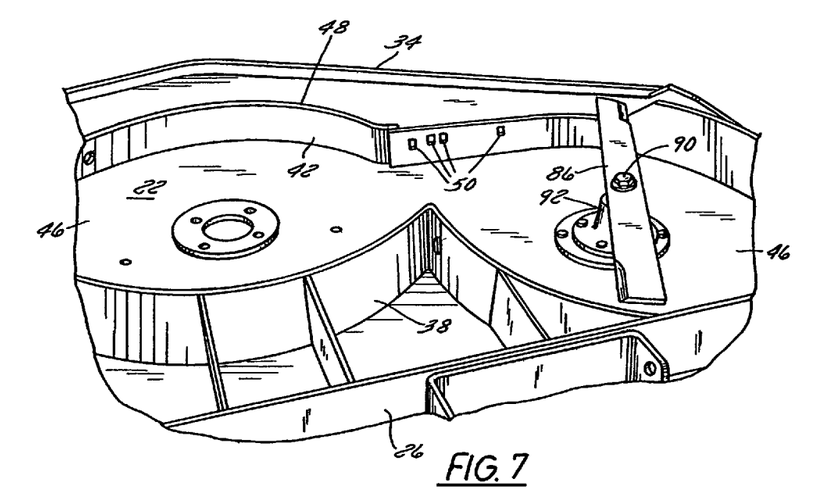
FIG. 7 is a rear perspective view of the cutting deck weldment with the adjustable baffle assembly removed.
Figure 8:
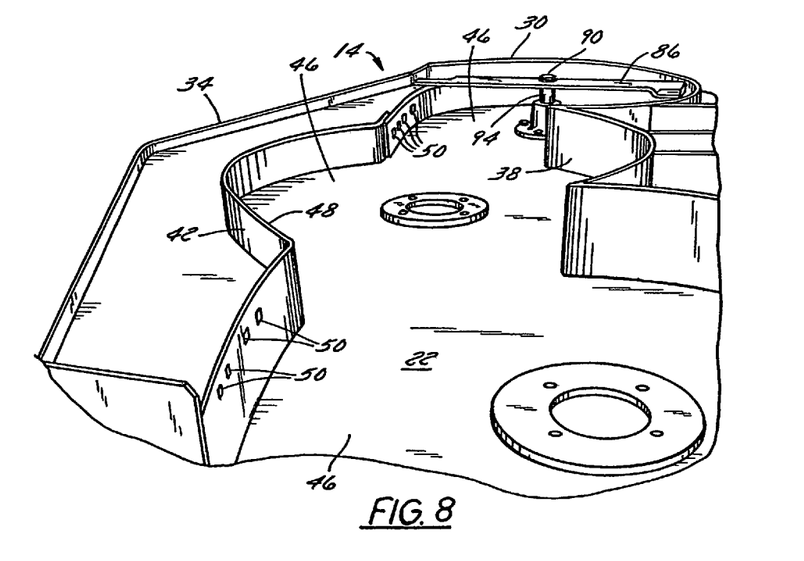
FIG. 8 is a side perspective view of the cutting deck weldment with the adjustable baffle assembly removed.
Figure 9:
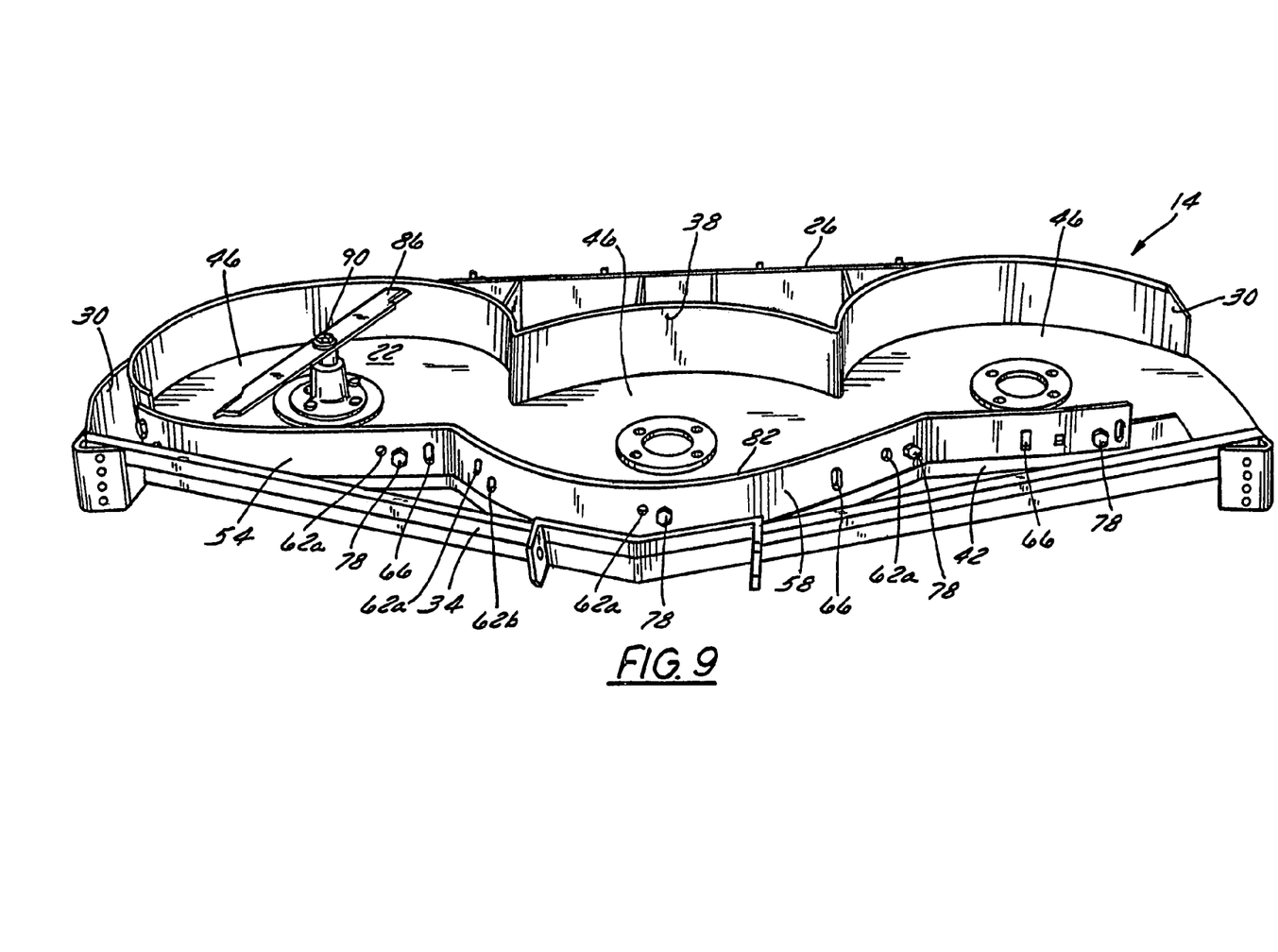
FIG. 9 is a front perspective view showing the adjustable baffle assembly mounted to the cutting deck.
Figure 10:
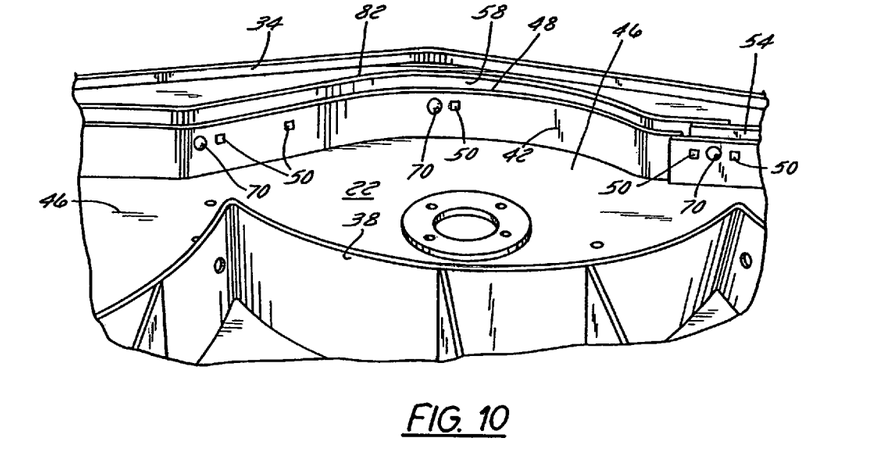
FIG. 10 is a rear perspective view showing the adjustable baffle assembly mounted to the cutting deck.
Figure 11:
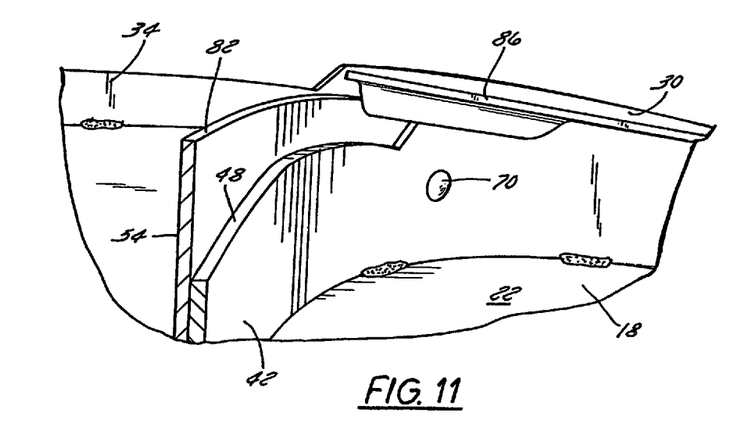
FIG. 11 is an enlarged side view, partially in section, showing the adjustable baffle assembly mounted to the cutting deck.

With reference to FIG. 4, the illustrated baffle assembly 10 is also mountable to the front flow control baffle weldment 42 to achieve a second baffle assembly height of approximately four inches from the bottom surface 22 of the deck 14. To achieve this second baffle assembly height setting, a top set of mounting holes 62b is aligned with corresponding mounting holes 50 of the front flow control baffle weldment 42. In the illustrated construction, the top set of mounting holes 62b is spaced such that when the mounting holes 62b are aligned with the corresponding mounting holes 50, and the fasteners 70 are passed through the holes 62b and 50 and secured with the washers 74 and nuts 78, the bottom edge 82 of the baffle assembly 10 extends approximately one inch beyond the lower edge 48 of the front flow control baffle weldment 42. The slots 66 remain in communication with corresponding mounting apertures 50 to permit the mounting of mulching baffles to the baffle assembly 10 and the front flow control baffle weldment 42. FIGS. 9–11 also illustrate the baffle assembly 10 mounted at the second baffle assembly height.

Figure 1:
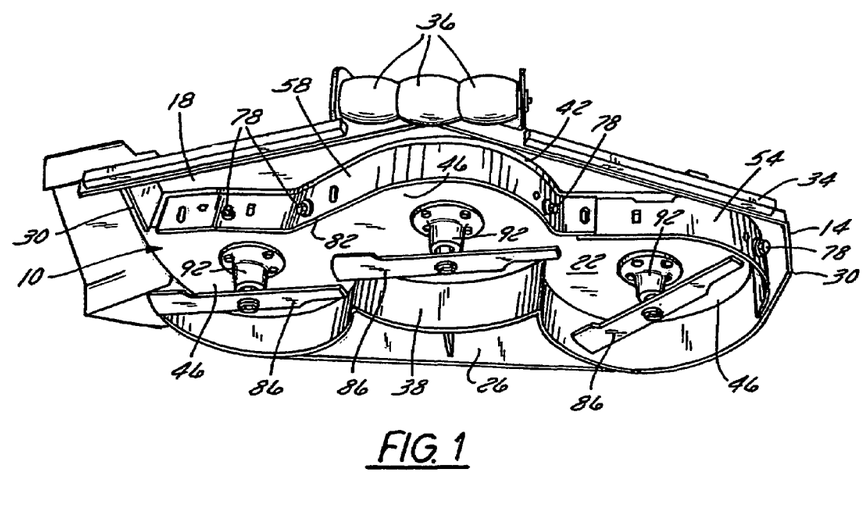
FIG. 1 illustrates an adjustable baffle assembly embodying the invention mounted to a cutting deck.
Figure 2:
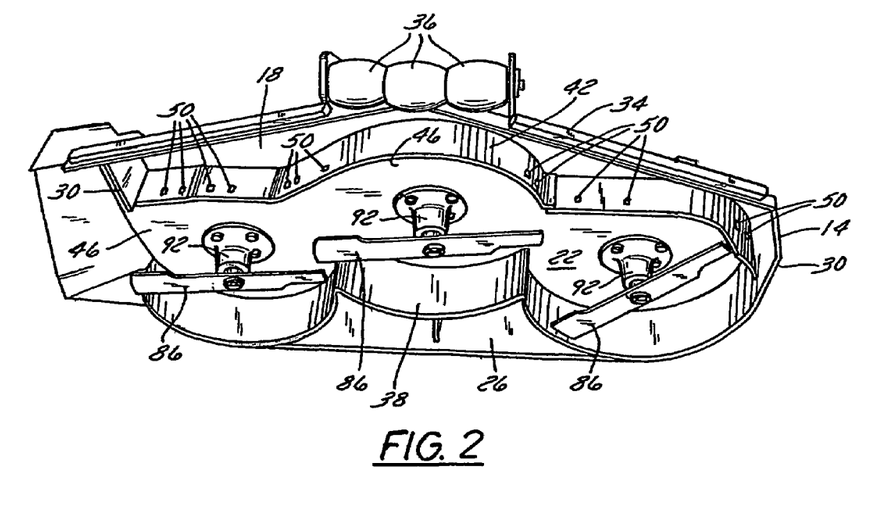
FIG. 2 illustrates the cutting deck of FIG. 1 shown with the adjustable baffle assembly removed.

While the first and second baffle heights of three and one-half and four inches, respectively, are discussed above and shown in the figures, it is to be understood that additional baffle height settings can be achieved by adding more mounting holes 50 and/or 62. Furthermore, the first and second baffle height settings can be varied from the illustrated three and one-half inch and four inch settings by changing the relative location of the mounting holes 50 and/or 62 with respect to the edges 48 and/or 82, respectively. Additionally, the baffle assembly 10 can be removed altogether, as shown in FIG. 2, to provide a three inch baffle height setting. It should also be noted that the lateral locations of the mounting holes with respect to the sidewalls 30 can be varied as desired, and will likely vary from deck to deck.

It should be appreciated that for uniform cutting it is desirable that the bottom edge 82 of the baffle assembly 10 extend substantially parallel to the lower surface 22 of the cutting deck. In this regard, the above-described construction of the baffle assembly 10 is provided with the individual sets of mounting holes 62a, 62b that are positioned at different distances with respect to the bottom edge 82. Alternative constructions (e.g. such as the construction described below) can include slots that allow for a substantially infinite amount of distance adjustment between the bottom edge 82 of the baffle assembly 10 and the lower surface 22 of the cutting deck. In such cases, visual indicia such as graduation marks or the like can be provided on each side of the baffle assembly 10 and/or the front flow control baffle weldment 42 to assist an operator in maintaining the bottom edge 82 in parallel relationship with the lower surface.

The invention thus provides a plurality of user-selectable settings to achieve optimum cutting performance for the specific mode of mowing and for the specific type of grass being mowed. Changing from one baffle assembly height setting to another is quick and easy and can be completed using a minimal number of tools.

Figure 12:
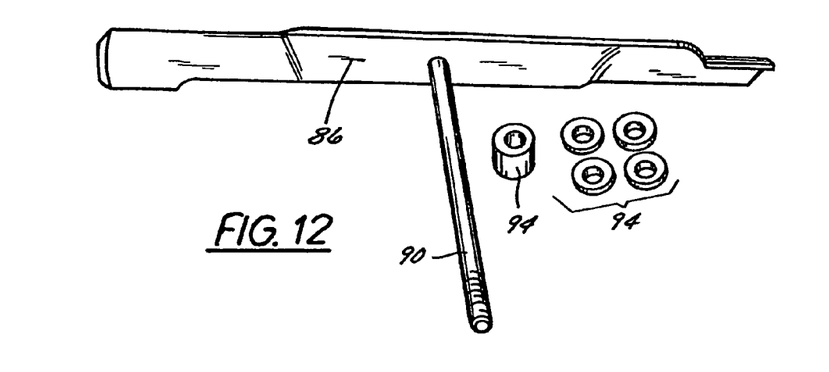
FIG. 12 is a perspective view showing a cutting blade and an assortment of spacers that can be used to adjust the location of the blade relative to the underside of the cutting deck.
Figure 13:
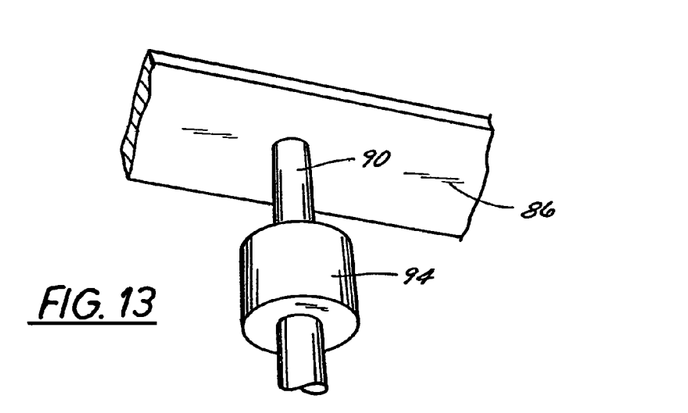
FIG. 13 is a perspective view showing a single spacer mounted on a blade mounting bolt.
Figure 14:
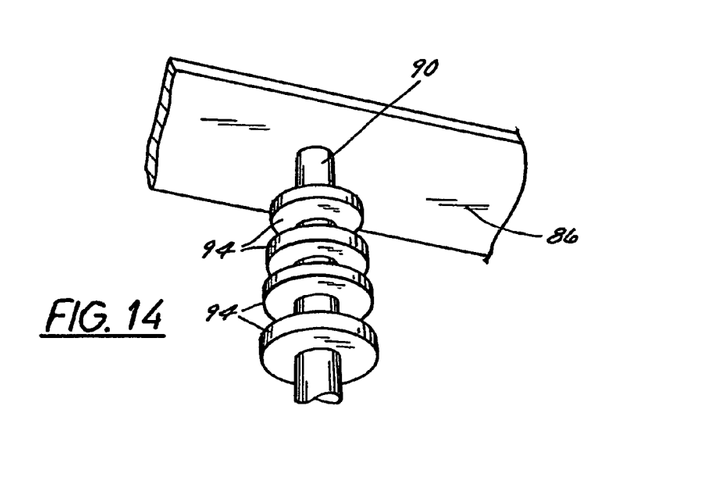
FIG. 14 is a perspective view showing multiple spacers mounted on the blade mounting bolt.

As seen in FIGS. 1–4, a cutting blade 86 is mounted for rotation on a blade mounting bolt 90 that is supported by a spindle 92 (see FIGS. 12–14) in each cutting chamber 46. The cutting blades 86 preferably each rotate in a common plane that is substantially parallel to the top wall 18. Referring to FIGS. 12–14, spacers 94 can be added or removed from between the spindle 92 and the cutting blades 86 as desired to change the cutting height by changing a first distance between the cutting blades 86 and the top wall 18. The baffle assembly height setting can the be adjusted to accommodate the cutting height change and to maintain or adjust a second distance between the bottom edge 82 and the cutting blades 86. By using the spacers 94, the vertical relationship between the cutting blades 86, the bottom surface 22, and the bottom edge 82 of the baffle assembly 10 or the lower edge 48 of the front flow control baffle weldment 42 can be adjusted and/or maintained for each baffle height and cutting height setting, or can be otherwise varied to achieve optimum cutting performance.

For example, during mulching operations, it is often preferred to have the bottom edge 82 of the baffle assembly 10 closer to the ground than the cutting blades 86, such that grass clippings are more apt to remain in the cutting chambers 46 for repeated cutting. During discharge mowing or bagging however, the baffle assembly 10 may be adjusted and/or spacers 94 may be added such that the cutting blades 86 are closer to the ground than the bottom edge 82 of the baffle assembly. In some instances, the relative distance between the bottom edge 82 and the cutting blades 86 is adjusted depending upon the type of grass being cut. For stiffer grasses, it is often preferred to raise the baffle assembly 10 with respect to the cutting blades 86 to prevent bending the grass prior to cutting. For softer grasses however, it is often preferred to lower the baffle assembly 10 with respect to the cutting blades 86 to reduce the likelihood of air exiting the front of the deck and blowing the grass flat prior to cutting.

Figure 15:
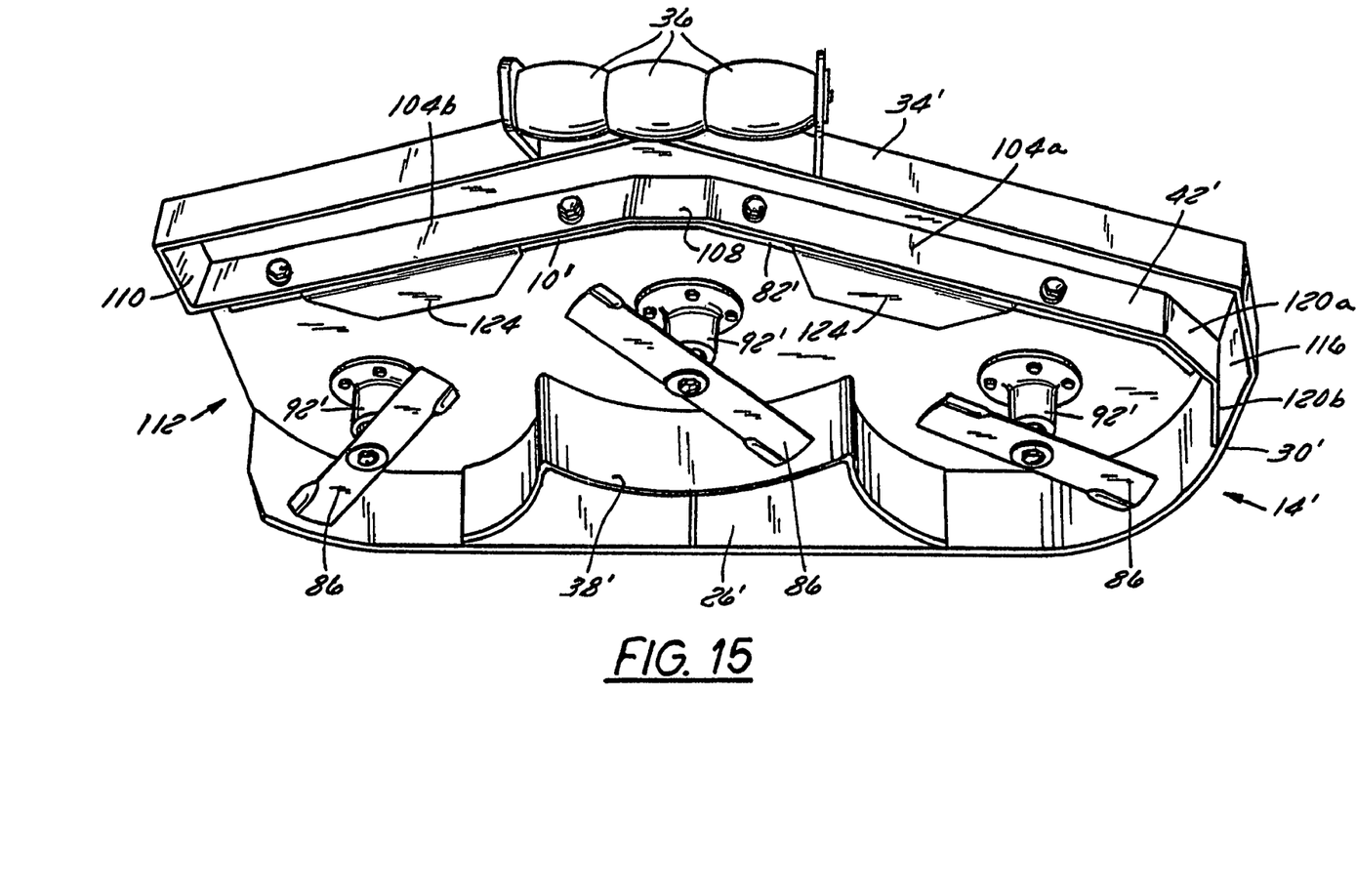
FIG. 15 illustrates an alternative embodiment of the adjustable baffle assembly embodying the present invention mounted to a cutting deck.
Figure 16:
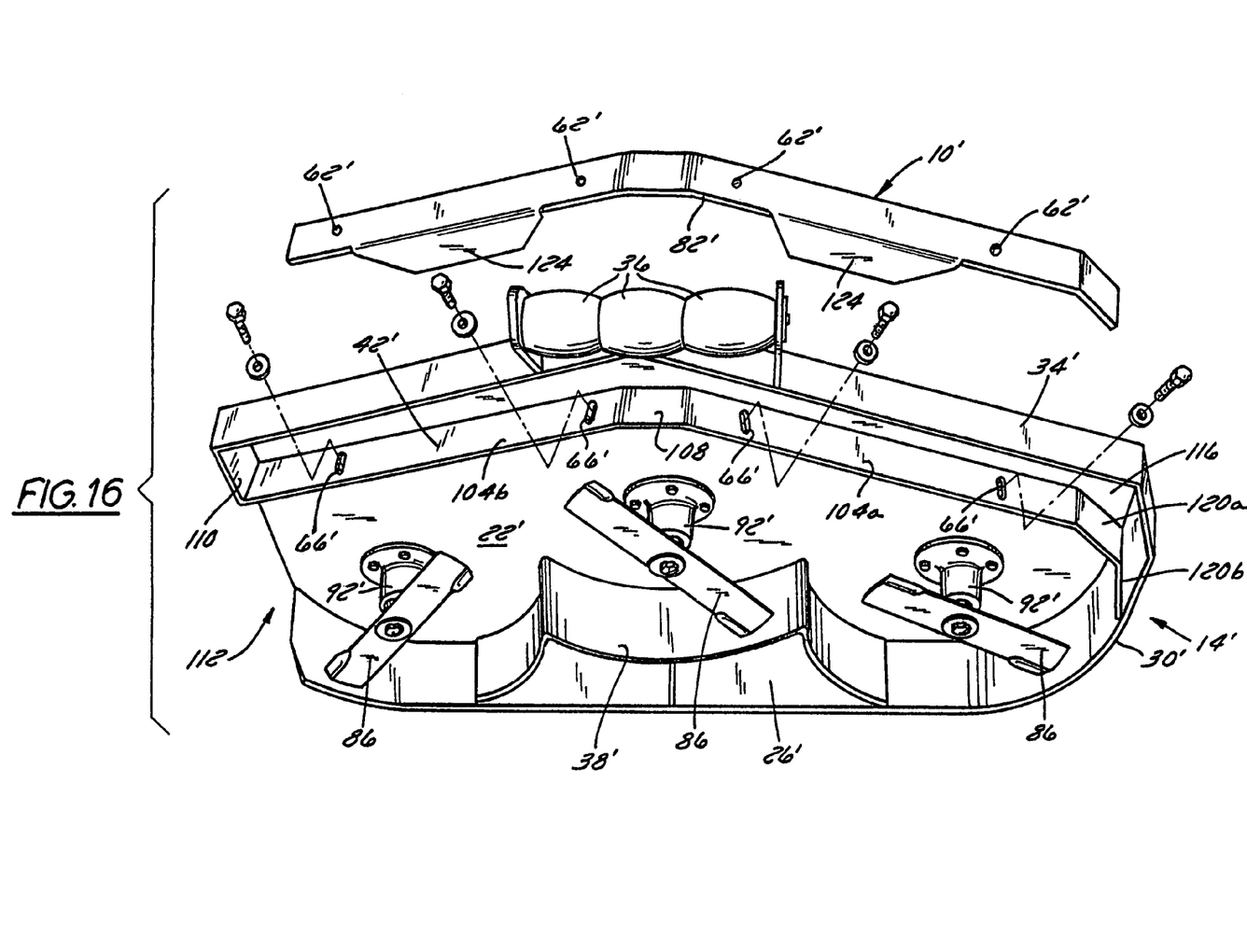
FIG. 16 is an exploded view of the embodiment shown in FIG. 15.
Figure 17:
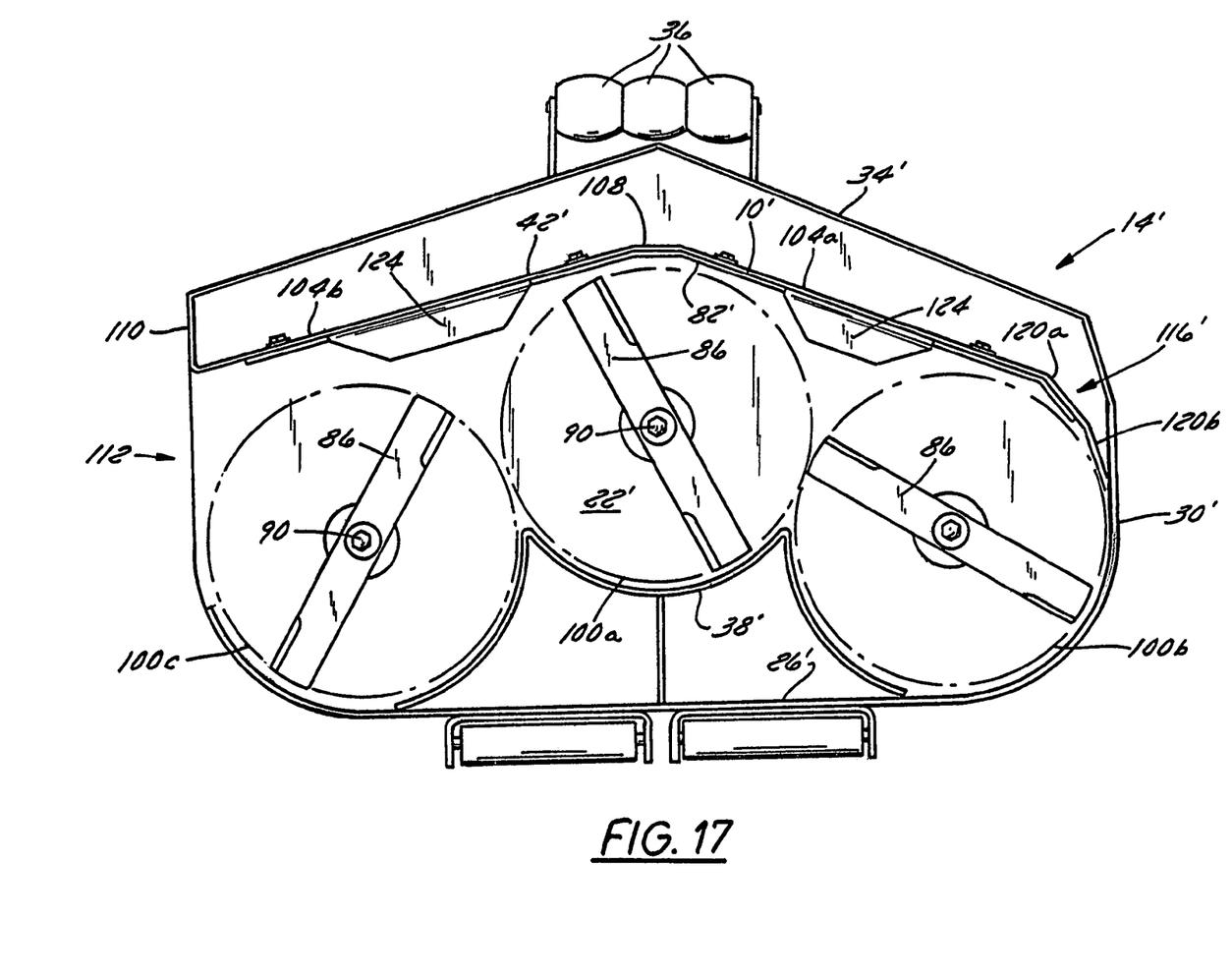
FIG. 17 is a bottom view of the embodiment shown in FIG. 15.

Referring now to FIGS. 15–17, a second embodiment of the front flow control baffle weldment 42' and baffle assembly 10' is illustrated. The contour of the front flow control baffle weldment 42' of FIGS. 15–17 includes a plurality of substantially linear sections that extend generally parallel to a series of imaginary lines extending tangentially with respect to circular cutting paths 100 defined by the cutting blades 86 (see FIG. 17). For the illustrated cutting deck 14', a center cutting circle 100a is positioned forwardly with respect to a pair of outer cutting circles 100b, 100c. By positioning the cutting blades 86 in such a manner, the cutting circles 100 "overlap" slightly when viewed from the front of the cutting deck to provide a uniform cutting path, as is well known in the art.

As best shown in FIG. 17, the front flow control baffle weldment 42' includes a first relatively long wall 104a that extends generally parallel to a line extending tangentially between the inner cutting circle 100a, and the outer cutting circle 100b. Similarly, a second relatively long wall 104b extends generally parallel to a line extending tangentially between the inner cutting circle 100a, and the outer cutting circle 100c. Due to the positioning of the cutting blades 86, the long walls 104a, 104b are angled with respect to one another. A generally forwardly facing nose wall 108 extends between the long walls 104a, 104b in front of the center cutting circle 100a.

One of the long walls (e.g. the long wall 104b as illustrated) preferably extends beyond the cutting circle 100c and includes a forwardly bent portion 110 that engages the front wall 34' of the cutting deck 14' and at least partially defines a discharge opening 112 for expelling cut grass clippings from the cutting deck 14'. The other of the long walls (e.g. the long wall 104a as illustrated) includes a bent portion 116 that defines at least one additional generally linear wall portion 120. As illustrated, the front flow control baffle weldment 42' includes two additional generally linear wall portions 120a and 120b that are bent generally rearwardly with respect to the long wall 104a and transition between the front flow control baffle weldment 42' and the sidewall 30'. The additional linear portions 120a, 120b are also arranged to be generally parallel to one or more lines that extend tangentially with respect to the cutting circle 100b.

FIGS. 15 and 17 illustrate the baffle assembly 10' that is configured for use with the above-described front flow control baffle weldment 42' installed on the cutting deck 14'. While the illustrated baffle assembly 10' is positioned rearwardly (e.g. proximate the cutting blades 86) of the front flow control baffle weldment 42', the baffle assembly 10' could also be positioned in front of the front flow control baffle weldment 42'. The baffle assembly 10' includes mounting holes 62' that are alignable with slots 66' defined in the front flow control baffle weldment 42'. As such, the baffle assembly 10' is adjustable to a plurality of positions. As mentioned above, graduation marks can be provided on the front flow control baffle weldment 42' and/or on the baffle assembly 10' to assist an operator adjusting the baffle assembly 10' to maintain a parallel relationship between the bottom edge 82' of the baffle assembly 10' and the bottom surface 22' of the cutting deck.

Both the front flow control baffle weldment 42' and the baffle assembly 10' are preferably constructed of a single metal plate or strip that is appropriately bent to define the contours described above. It should be appreciated however that both the front flow control baffle weldment 42' and the baffle assembly 10' can be constructed of a plurality of pieces that are welded, fastened, or otherwise secured together. Also, the illustrated front flow control baffle weldment 42' is secured to the cutting deck 14' by welding, however other ways (e.g. bolting) of securing the front flow control baffle weldment 42' to the cutting deck 14' are possible as well.

The illustrated baffle assembly 10' also includes a pair of generally trapezoidal flanges 124 that extend generally rearwardly from the bottom edge 82' of the baffle assembly 10' and into a generally triangularly shaped region between the cutting circles 100. The flanges 124 are configured to extend substantially parallel to the top wall 18 during normal lawnmower operation. As illustrated, the flanges 124 are positioned generally midway between adjacent cutting blades 86 and are provided to reduce the undesirable blowout or expulsion of air and grass clippings from underneath the cutting deck 14' during lawnmower operation. In the illustrated embodiment, the flanges 124 are approximately 13 to 14 inches long, however the specific size of the flanges 124 is dependent upon, among other things, the size of the cutting deck 14.

Figure 18:
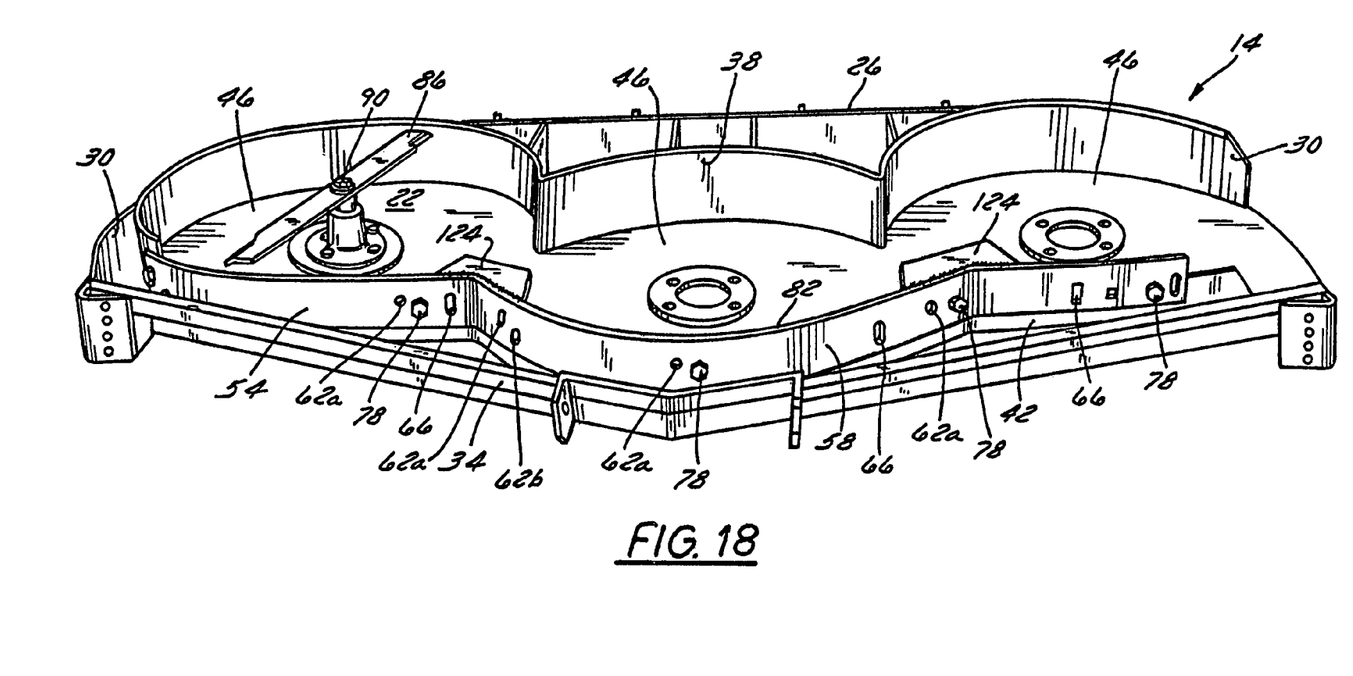
FIG. 18 is a front perspective view showing flanges on the adjustable baffle assembly of FIG. 1.

The flanges 124 illustrated in FIGS. 15–17 are formed by bending, however other methods of attaching the flanges 124 are possible as well. For example, FIG. 18 shows flanges 124 that are attached by welding. In addition, the flanges 124 of FIG. 18 are adapted to extend from non-linear portions of the adjustable baffle assembly. Various fastener arrangements can also be used to secure the flanges 124 to the adjustable baffle. Such fastener arrangements can be configured with slots or individual sets of holes similar to those described above such that the position of the flanges 124 is adjustable independently of the position of the remainder of the adjustable baffle assembly.

Figure 19:
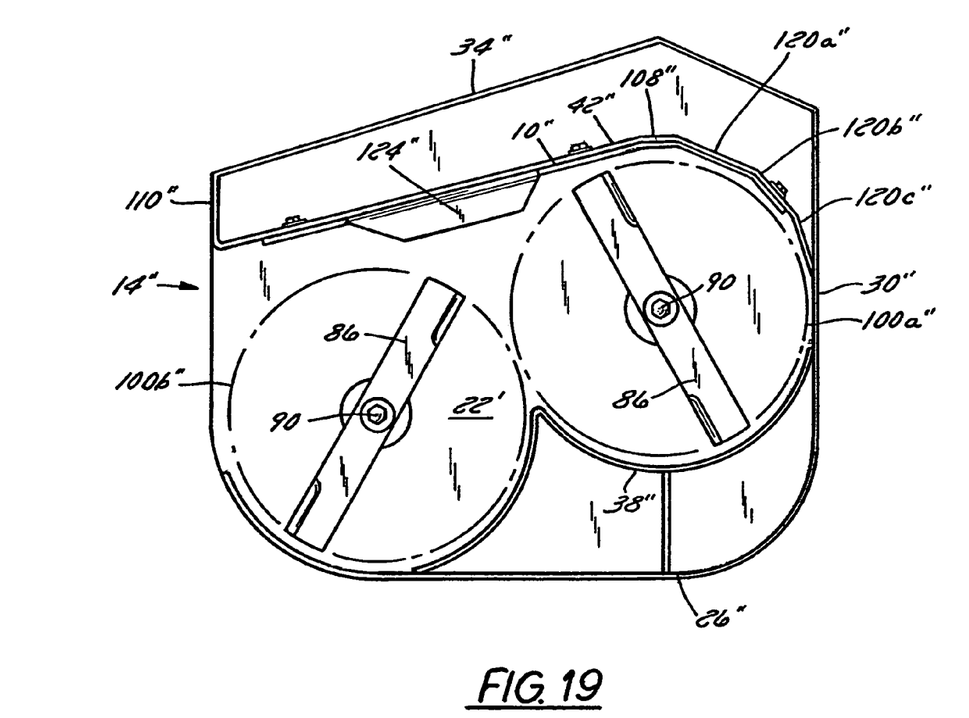
FIG. 19 illustrates an alternative embodiment of the adjustable baffle assembly for a two-bladed cutting deck.

FIG. 19 illustrates another embodiment of the front flow control baffle weldment 42" and baffle assembly 10". The embodiment of FIG. 19 includes features similar to those described above with respect to FIGS. 15–17, however the cutting deck 14" of FIG. 19 includes two cutting blades 86 instead of three. The blades 86 define two cutting circles 100a", 100b" that are positioned to "overlap" one another when viewed from the front of the cutting deck 14". The front flow control baffle weldment 42" is contoured to include a plurality of substantially linear wall sections that are substantially parallel to one or more lines that extend tangentially with respect to the cutting circles 100a" 100b". The illustrated front flow control baffle weldment 42" includes a single long wall 104", a forwardly bent wall 110", a forwardly facing nose wall 108", and three substantially linear walls 120a", 120b", and 120c", each wall being substantially parallel to one or more lines that extend tangentially with respect to at least one of the cutting circles 100a", 100b". Of course, the contour of the baffle assembly 10", which is clearly illustrated in FIG. 19, substantially corresponds to the contour of the front flow control baffle weldment 42". The baffle assembly 10" of FIG. 19 also includes a generally rearwardly extending flange 124" positioned between the cutting blades 86 to reduce the undesirable blowout or expulsion of air and grass clippings from underneath the cutting deck 14". Like the baffle assembly 10', the baffle assembly 10" can be positioned on either side of the front flow control baffle weldment 42".

Various features of the invention are set forth in the following claims.

What is claimed is:

1. A mower deck comprising:

a top wall having a bottom surface;

a rear baffle that extends below the bottom surface of the top wall and that at least partially surrounds and defines at least two cutting chambers;

a cutting blade located in each of the cutting chambers;

a front wall that extends below the bottom surface of the top wall in front of the cutting blades to a bottom edge that extends at least essentially in a common plane from a first end of the front wall to a second end of the front wall, the front wall being non-removably coupled to the top wall; and an adjustable baffle that extends below the bottom surface of the top wall in front of at least one entire cutting chamber and that is selectively movable relative to the front wall, the adjustable baffle being repositionable on the deck in at least two positions such that the size of at least one of the cutting chambers is variable, a discharge opening being formed in the cutter deck behind the adjustable baffle and expelling cut grass clippings from the mower deck during mower operation.

2. The deck of claim 1, wherein the adjustable baffle is vertically repositionable relative to the front wall and to vary the size of the at least one cutting chamber by varying the depth of the at least one cutting chamber.

3. The deck of claim 2, wherein the adjustable baffle has at least one flange extending horizontally from a vertical portion thereof.

4. The deck of claim 1, wherein the cutting chambers are open to one another in each of the positions.

5. The deck of claim 1, wherein the front wall is welded to the bottom surface of the top wall.

6. The deck of claim 1, wherein the discharge opening is a side-discharge opening formed between the adjustable baffle and the rear baffle.

7. The deck of claim 1, wherein a path extends uninterrupted along the bottom surface of the top wall through the cutting chambers and out of the discharge opening.

8. A mower deck comprising:

a top wall having a bottom surface;

a rear baffle that extends below the bottom surface of the top wall and that at least partially surrounds and defines at least two cutting chambers;

a cutting blade located in each of the cutting chambers;

a front wall that is non-removably coupled to the top wall and that extends below the bottom surface of the top wall in front of the cutting blades to a bottom edge that extends at least essentially in a common plane from a first end of the front wall to a second end of the front wall;

an adjustable baffle that extends below the bottom surface of the top wall in front of at least one entire cutting chamber and that is selectively movable relative to the front wall, the adjustable baffle being repositionable on the deck in at least two positions such that the size of at least one of the cutting chambers is variable, a discharge opening being formed in the cutter deck and being at least substantially unobstructed by the adjustable baffle;

a sidewall that extends below the bottom surface of the top wall on one side of the cutter deck; and a side-discharge opening that is located opposite the sidewall, wherein a path extends uninterrupted along the bottom surface of the top wall through the cutting chambers and out of the discharge opening.

\* \* \* \* \*